Sept. 1, 1964  J. G. GUTSHALL  3,146,846
SEAT BELT BUCKLE
Filed Dec. 24, 1962

INVENTOR
James H. Gutshall

United States Patent Office 3,146,846
Patented Sept. 1, 1964

3,146,846
SEAT BELT BUCKLE
James G. Gutshall, 103 W. Marshall, Phoenix, Ariz.
Filed Dec. 24, 1962, Ser. No. 246,714
4 Claims. (Cl. 180—82)

This invention concerns seat belt buckles.

One of the objects of the invention is to provide a seat belt buckle, for use in automobiles, airplanes and the like, which will release when necessary, a short time after any accident, but which will otherwise hold the belt securely fastened.

Another object of the invention is to provide a safety belt buckle which may be easily fastened and will hold until definitely released either by manual operation or automatically a predetermined time after an accident takes place.

Still another object is to provide a seat belt buckle having vacuum and mechanical means for holding it in latched condition until definitely released by mechanical means.

Heretofore belt buckles have been used to a large extent in land and air vehicles where it was considered necessary to keep the passenger in his seat during or after an accident, crash or upset. These belts, previously used, were manually latched or buckled and held securely even though great pressure was exerted on the belts. The buckles were, are and have been manually operated both to buckle and unbuckle and release. Heretofore some attempt has been made to provide electrical means to assist in latching the buckle but this has been ineffective for the purposes herein considered. This applicant has observed that after an accident the person buckled into the seat by the so-called safety belt is very often immobilized. This is due to the sudden shock or because the person has been knocked completely unconscious. During this period the vehicle may also be immobilized and it may be that a fire or other hazard has broken out in the vehicle itself. The passenger confined to his seat by the seat belt may not be able to help himself or even to release the safety seat belt because of his condition aforesaid. Very often rescuers approaching a wreck after such an accident cannot get the victim out of the seat because the safety belt holds him tightly in the seat. The often warped condition of the vehicle body makes this condition harder to cope with.

Therefore, an overall object of this invention is to provide a seat belt which will hold tightly before and during the accident or casualty and will completely release the victim a predetermined time after the impact and the result thereof. This holding depends upon the nature of the safety belt buckle and its release depends upon mechanism, hereafter disclosed, which will release the belt in a given time after the accident.

I attain the foregoing objects by means of the devices, parts and combinations of parts shown in the accompanying drawings and explained in the following specification.

In the drawings—

Similar numerals refer to similar parts in the several views.

This device consists principally of a releasable buckle A which, when buckled holds together the unattached ends of safety belt portions 12 and 12a. The opposite ends of these belts are attached to portions of the seat and body structure (not shown) of the automobile on which the device is installed.

Figure 1:
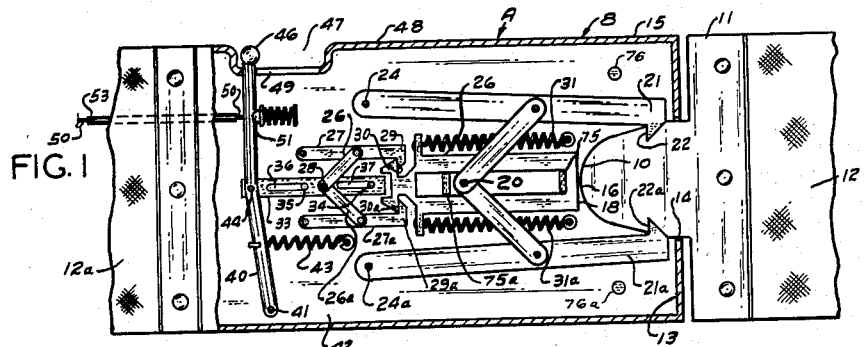
FIGURE 1 is an elevational view of a belt buckle incorporating and embodying my improvements with portions of the case broken away to show interior parts, and with the parts in latched or buckled position.
Figure 2:
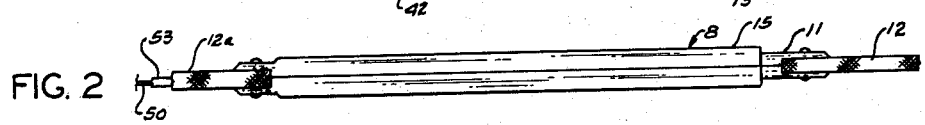
FIGURE 2 is a plan or edge view of the buckle.
Figure 3:
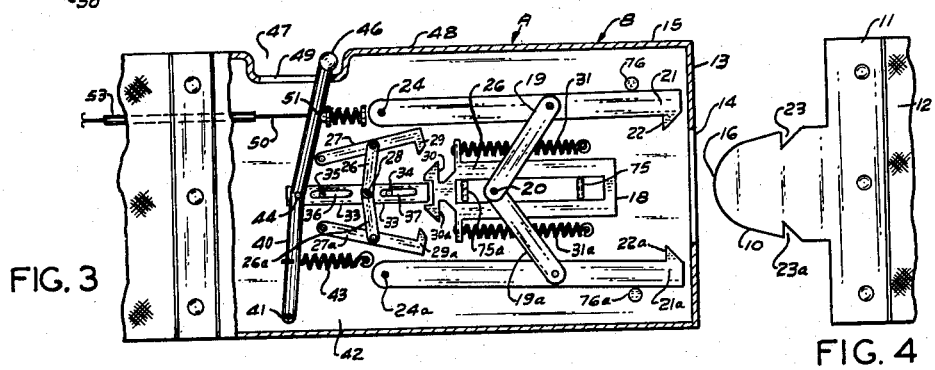
FIGURE 3 is a view similar to FIGURE 1 but with the interior parts in unlatched position.
Figure 4:
FIGURE 4 is a front elevational view of a portion of the free end of one of the belt parts with the latch tongue ready to enter the buckle body.
Figure 5:
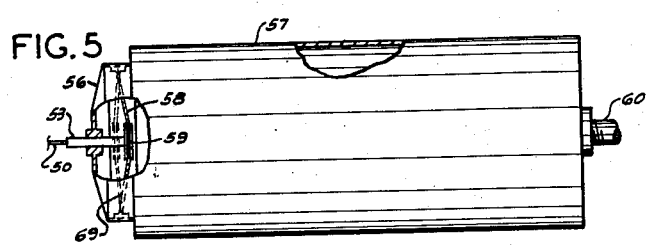
FIGURE 5 is a side elevational view of the vacuum accumulator.
Figure 6:
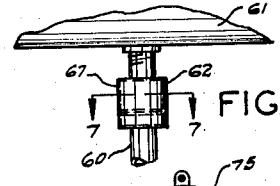
FIGURE 6 is a side elevational view of a fragment of the engine intake manifold and the check valve used to quickly accumulate vacuum in the vacuum accumulating chamber and to slowly dissipate the vacuum.

The buckle body 8 has a rectangular flat body case 15 which has its inner end attached to belt portion 12a and the wall 13 of its outer end portion provided with a tongue receiving slot 14. The opposite or complementary buckle part 11 is a plate attached to the unattached end of belt portion 12. This belt portion has an outwardly extending tongue 10 provided with a retaining notch 23 on its top edge and a notch 23a on its bottom edge and a rounded outer end 16, all adapted to enter slot 14 in case 15. Upon entrance of tongue 10 through the slot 14, the outer end 16 of the tongue encounters the latch setting slide 18. In doing this, and when further pressure is applied, the links 19 and 19a, which are hinged to hook bars 21 and 21a are forced inwardly by their joining pin-bearing 20. Pin 20 is set in slide 18. This sliding movement draws the tongue engaging latch hooks 21 and 21a together so that the hook portions 22 and 22a engage in the notches 23 and 23a of the tongue 10, as shown in FIGURE 1. Slide 18 is slidably supported on blocks 75 and 75a. Springs 31 and 31a urge slide 18 outward.

With the notches thus engaged it will be noticed that the hooks hold the tongue in place and are themselves pivotally supported on bearings 24 and 24a within the buckle body 15. Opening movement of bars 21 and 21a is stopped by pins 78 and 78a.

Rear motion of the latch slide 18 also forces setting bar 33 to the rear so that joining pin bearing 28 moves links 26 angularly inwardly, draws them together and causes the hooks 29 and 29a on bars 27 and 27a to engage notches 30 and 30a on the rear of slide 18 to hold the slide latch in retracted position and maintain it against the urge of springs 31 and 31a.

Springs 31 and 31a tend to move the latch setting mechanism to the front or to the outward position while the latch setting bar portion 33 slides on the pins 34 and 35 which engage in slots 36 and 37 in bar 33.

Bar 33 can also be slidably operated by the lever 40 which is pivoted at the bottom on pin 41 which is affixed to the inside of the case wall 42. Spring 43 urges the lever 40 forward and thus urges pin 44 forward so that the urge of lever 40 is communicated to the bar 33.

At the top end of lever 40 there is a knob 46 which is accessible to the user's finger by reason of recess 47 in the top wall 48 of the case 15. A slot 49 permits the upper part of the lever 40 to slide forwardly and rearwardly. Push-pull spring wire 50 is attached to lever 40 by means of a ball joint 51 disposed near its top end and above the pivot pin 44 and the fulcrum pin 41. This wire slides freely in flexible tube 53 which is led through the strap 12 to the diaphragm 58 of vacuum chamber tank 57 and attached to button 59. Wire 50, as attached to diaphragm 58 in chamber 57, moves responsive to the central portion of diaphragm 58 by reason of the attachment button 59.

Figure 9:
FIGURE 9 is a plan view of a mercury switch used to disconnect the engine circuit when the car is disposed at too great an angle following an accident.
Figure 9:
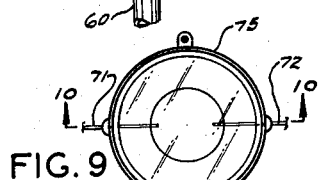
Figure 10:
FIGURE 10 is a sectional view of a switch taken substantially on line 10—10 of FIGURE 9.
Figure 10:
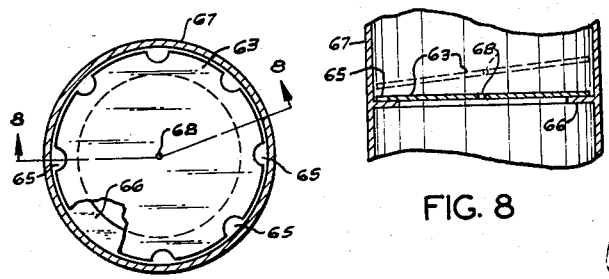
Figure 7:
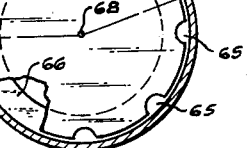
FIGURE 7 is a sectional view of the check valve as viewed on line 7—7 of FIGURE 6, drawn on an enlarged scale.
Figure 8:
FIGURE 8 is a sectional view of the check valve and its housing taken substantially on line 8—8 of FIGURE 7.

The vacuum chamber 57 is connected through pipe 60 to an engine intake manifold 61 of the automobile on which the device is installed. In this pipe there is a check valve 62 which has a center valve plate 63 arranged to permit the air to enter quickly from the chamber 57 into the manifold. To accomplish this the valve is disk shaped and has arcuate notches 65 around its perimeter. This disk seats on an annular shoulder 66 on the inner surface of the cylindrical body 67 of the valve. In the center of disk 63 there is a pressure escape hole 68 which permits the vacuum to be restored to barometric pressure when desired and when the holding of diaphragm 58 is to be released after a predetermined period. In FIGURES 9 and 10 a mercury type switch 75 is shown which is inserted in the ignition circuit of the automobile on which the device is installed. In this switch, a pool of mercury 70 makes contact with the two contacts 71 and 72 when the switch case 76 is substantially level. When this switch is installed on a stationary part of the automobile with its case 76 horizontal, the pool 70 maintains the ignition circuit from the battery and generator on the car through the ignition coil. If the car is tilted (as in an accident) so that the base 73 is also tilted, the mercury in pool 70 runs out of the pool and breaks contact with one or the other of the contacts 71 and 72. This breaks the ignition circuit so that the motor is stopped. This device will prevent the motor from running after an upset which takes place as the result of an accident, eliminates fire hazard, and by stopping the motor opens the buckle 8 after an interval, depending on the size of leak hole 68.

I claim:

1. A releasable buckle comprising a seat belt portions attached to an automobile body, one of said portions having a buckle part including an outwardly extending tongue provided with notches, a buckle body attached to the other belt portion consisting of a rectangular thin case having a belt attaching end and a tongue receiving end, a tongue receiving slot in the tongue receiving end of said case, hooks pivotally supported in said case and disposed to engage the notches in said tongue when said tongue is inserted through said slot, means connected to an engine intake manifold including a vacuum chamber having a timed leak and a flexible diaphragm connected to said hooks to retract said hooks to release said tongue responsive to the timed leak, and an independently operating manual release for said tongue.

2. In an automotive vehicle, a buckle for buckling the unattached ends of a two part safety belt together, comprising a tongue part attached to one of the belt parts having a flat tongue with notches on its edges, a flat buckle case attached to the end of the other buckle part having an opening to receive said tongue, a pair of pivotally supported latch hooks within said case disposed to engage the notches on said tongue when said tongue is inserted into said case; a latch setting slide slidably supported within said case and having its outer end disposed to be in aligned abutment contact with the outer end of said tongue when inserted into said case, links to move said latch hooks together when said setting slide is moved inwardly in said case, said slide having notches at its rear; springs attached to said setting slide and case normally urging said slide outward; a latch setting bar slidably supported in said case in aligned relation with said setting slide and having its front end in abutment contact with the rear end of said setting slide; a vertically disposed manual unlatching lever pivoted at its lower end within said case and having its upper end extending outward through the upper edge of said case and pivoted to said bar, a spring attached to said case and said lever normally urging the top of said lever forward; a pair of hooks pivoted in said case and adapted to engage said setting slide when it is moved to a rear position, links pivoted to said setting bar and said last-mentioned hooks, disposed to spread said last-mentioned hooks and release them from the notches in said setting slide when said setting bar is moved forwardly by said manual lever; a push pull spring wire attached to the upper part of said lever and extending outward from said case and longitudinally through the belt part to which the case is attached; a vacuum chamber having a flexible diaphragm, and attached by a pipe to the intake manifold of the automotive vehicle on which said belt parts are installed, a center valve plate operative in said pipe, a slow leak hole in said valve plate; and a means of attachment of said push pull spring wire to said diaphragm so the inward position of said diaphragm as induced by vacuum, will maintain said setting slide engaging hooks and said latch hooks in engaging position so long as vacuum is maintained in said chamber, and so that said hooks will be released when said vacuum is eliminated.

3. The device as in claim 2 including a normally closed tilt-responsive switch disposed in the ignition circuit of said automotive vehicle for removing vacuum from said chamber by breaking the ignition circuit upon upset of said automotive vehicle.

4. In an automotive vehicle, a buckle for buckling the unattached ends of a two part safety belt together, comprising a tongue part attached to one of the belt parts having a flat tongue with notches on its edges, a flat buckle case attached to the end of the other buckle part having an opening to receive said tongue, a pair of pivotally supported latch hooks within said case disposed to engage the notches on said tongue when said tongue is inserted into said case; a latch setting slide slidably supported within said case and having its outer end disposed to be in aligned abutment contact with the outer end of said tongue when inserted into said casing, links to move said latch hooks together when said setting slide is moved inwardly in said case, said slide having notches at its rear; springs attached to said setting slide and case normally urging said slide outward; a latch setting bar slidably supported in said case in aligned relation with said setting slide and having its front end in abutment contact with the rear end of said setting slide; a vertically disposed manual unlatching lever pivoted at its lower end within said case and having its upper end extending outward through the upper edge of said case and pivoted to said bar, a spring attached to said case and said lever normally urging the top of said lever forward; a pair of hooks pivoted in said case and adapted to engage said setting slide when it is moved to a rear position, links pivoted to said setting bar and said last-mentioned hooks, disposed to spread said last-mentioned hooks and release them from the notches in said setting slide when said setting bar is moved forwardly by said manual lever; a push pull spring wire attached to the upper part of said lever and extending outward from said case and longitudinally through the belt part to which the case is attached; and means for releasing said spring wire in case of upset of said automobile so that said spring wire will be drawn toward said case by the urge of the spring on said lever; said means being attached to the automobile on which said device is installed.

References Cited in the file of this patent

UNITED STATES PATENTS

| | | |
|---|---|---|
| 1,758,218 | Poznik | Aug. 7, 1956 |
| 2,802,073 | Simon | Aug. 6, 1957 |
| 2,845,676 | Huber | Aug. 5, 1958 |
| 2,856,665 | Gimalouski | Oct. 21, 1958 |
| 2,927,655 | Leslie et al. | Mar. 8, 1960 |
| 3,011,040 | Remer | Nov. 28, 1961 |